| (12) | United States Patent | (10) Patent No.: | US 8,825,227 B2 |
|---|---|---|---|
| | Saint-Marc et al. | (45) Date of Patent: | Sep. 2, 2014 |

(54) FADEC AND AVIONIC COMPONENT DISTRIBUTED ARCHITECTURE

(75) Inventors: Laurent Saint-Marc, Nerac (FR); Luc Brunel, Toulouse (FR); Patrick Zaccaria, Toulouse (FR); Matthieu Alexandre, Toulouse (FR); Julien Feau, Toulouse (FR); Frédéric Leborgne, Toulouse (FR); Thierry Immordino, Montgiscard (FR); Jean-François Belkadi, Toulouse (FR); Nathalie Durand, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 1045 days.

(21) Appl. No.: 12/675,978

(22) PCT Filed: Aug. 20, 2008

(86) PCT No.: PCT/FR2008/051512
§ 371 (c)(1),
(2), (4) Date: Jul. 19, 2010

(87) PCT Pub. No.: WO2009/030856
PCT Pub. Date: Mar. 12, 2009

(65) Prior Publication Data
US 2010/0292870 A1 Nov. 18, 2010

(30) Foreign Application Priority Data
Sep. 3, 2007 (FR) .................................... 07 57333

(51) Int. Cl.
*G06F 19/00* (2011.01)
*G06F 15/16* (2006.01)
*H04L 12/26* (2006.01)

(52) U.S. Cl.
USPC ...................................... 701/3; 701/4; 701/16

(58) Field of Classification Search
None
See application file for complete search history.

(56) References Cited

U.S. PATENT DOCUMENTS

| 5,136,841 | A | * | 8/1992 | Zimmerman | .................... 60/233 |
| 5,270,931 | A | | 12/1993 | Appleford | |
| 5,761,625 | A | | 6/1998 | Honcik et al. | |
| 5,893,040 | A | | 4/1999 | Gunn et al. | |
| 6,443,399 | B1 | * | 9/2002 | Yount et al. | .................... 244/196 |
| 8,078,055 | B1 | * | 12/2011 | Mazuk et al. | .................... 398/66 |
| 8,301,867 | B1 | * | 10/2012 | Mazuk et al. | .................... 712/36 |

(Continued)

FOREIGN PATENT DOCUMENTS

| EP | 0 807 897 | 11/1997 |
| GB | 2 427 711 | 1/2007 |
| WO | 96 41260 | 12/1996 |
| WO | WO2007057189 | * 5/2007 |

*Primary Examiner* — James Trammell
*Assistant Examiner* — Demetra Smith-Stewart
(74) *Attorney, Agent, or Firm* — Oblon, Spivak, McClelland, Maier & Neustadt, L.L.P.

(57) ABSTRACT

A device for a motorized aircraft includes at least one avionic component positioned in the aircraft, at least one engine interface positioned in the aircraft and at least one engine controller positioned in or near an engine of the aircraft. The at least one engine interface is designed to exchange data between the at least one avionic component and the at least one engine controller. The at least one engine interface is generic and able to communicate with engine controllers of various types that may be mounted on the aircraft. The at least one engine controller is specific to a particular engine.

13 Claims, 2 Drawing Sheets

(56) References Cited

U.S. PATENT DOCUMENTS

| | | | |
|---|---|---|---|
| 8,306,421 B1 * | 11/2012 | Mazuk et al. | 398/66 |
| 8,391,788 B1 * | 3/2013 | Mazuk et al. | 455/41.2 |
| 2006/0042846 A1 * | 3/2006 | Kojori et al. | 180/65.8 |
| 2007/0055435 A1 | 3/2007 | Muramatsu et al. | |
| 2009/0312892 A1 * | 12/2009 | Mahoney et al. | 701/3 |

* cited by examiner

FADEC AND AVIONIC COMPONENT DISTRIBUTED ARCHITECTURE

This invention relates to avionic systems and more particularly to an architecture according to which the functions of a FADEC are shared between the FADEC itself and avionic components.

Present-day on-board electronic equipment items and avionic systems are more and more complex and more and more effective, integrating numerous advanced functionalities and multiplying the interconnections between the systems.

These highly integrated on-board avionic systems, based on hardware components, software components and a shared communication network, are increasing in number and complexity at the pace of an ongoing technological evolution, opening up new prospects for the aircraft manufacturers. Nevertheless, the advent of these new technologies, these new concepts and these new avionic systems entails research and development delays as well as high development, integration and maintenance costs.

In particular, the avionic systems can be distinguished from the engine control systems called FADECs (acronym for Full Authority Digital Engine Control in English terminology). These systems, although having different functions and generally being developed by different companies, are connected by complex communication means that have as an object, in particular, the control and monitoring of the engines.

One FADEC is associated with each engine. It often is located in a compartment for the blower for the jet engines. It generally comprises two separate channels so as to create a functional redundancy. A FADEC integrates one electronic control module per channel, programs associated with these modules, sensors and the necessary wiring.

Figure 1:
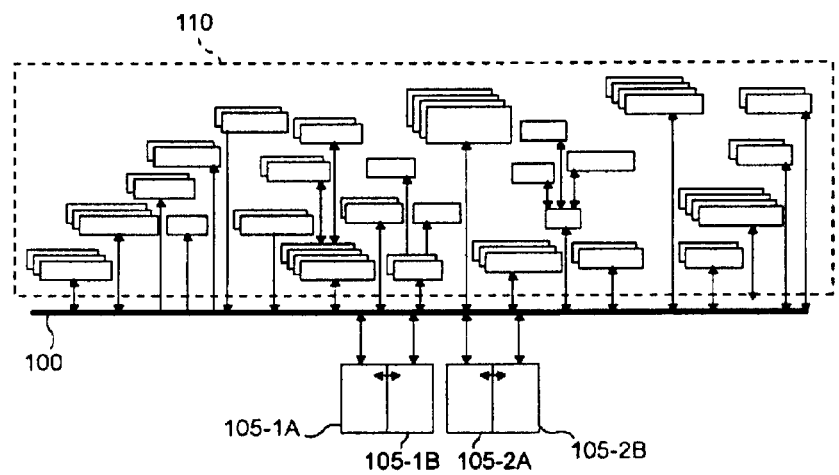

FIG. 1 illustrates an example of connection 100 between the FADECs of an aircraft comprising two engines and the avionic components. The connection here is implemented by a communication network. Two FADECs 105-1 and 105-2 each comprising two channels A and B are used. FADEC 105-1 is the FADEC associated with the first engine while FADEC 105-2 is the FADEC associated with the second engine. The set of avionic components exchanging data with the FADECs here has the reference 110.

It generally is possible to mount several types of engines on an aircraft, the choice being determined, for example, in accordance with the needs of the airline companies. It then is necessary to adapt the avionic systems to the different engine control systems that can be used or to design avionic systems adapted for several types of engine control systems. It also is necessary to design the engine control system for each new engine type.

The invention makes it possible to resolve at least one of the problems set forth above and in particular to simplify the interface between FADECs and avionic components, to reduce the development costs and delays for FADECS, to improve the operational level of the electronic systems, to standardize some of the functions of the FADEC in the different engine types of an aircraft and to heighten the independence between the design cycles of the aircraft manufacturers and those of the engine manufacturers.

The invention thus has as an object a device for an engine-operated aircraft comprising at least one avionic component positioned in the said aircraft and at least one engine control positioned in or close to an engine of the said aircraft, this device further comprising at least one engine interface positioned in the said aircraft, the said at least one engine interface being adapted for exchanging data between the said at least one avionic component and the said at least one engine control, the said at least one engine interface being generic and adapted for communicating with engine controls of different types that can be mounted on the said aircraft, the said at least one engine control being specific to one type of engine.

The device according to the invention thus makes it possible to limit the constraints between the aircraft manufacturers and the engine manufacturers so as to optimize, in particular, the times and the costs for development and maintenance.

According to a particular embodiment, the said at least one engine interface comprises means for selecting and validating the said data exchanged between the said at least one avionic component and the said at least one engine control so as to centralize the functions of transfer of data between the said at least one avionic component and the said at least one engine control.

Still according to a particular embodiment, the said at least one engine interface comprises means for validating at least some of the said data exchanged between the said at least one avionic component and the said at least one engine control so as to centralize the functions of data validation between the said at least one avionic component and the said at least one engine control.

According to a particular embodiment, the said at least one engine interface is at least partially implemented in a computer of LRU type and/or in a modular avionic computer of IMA type.

The said at least one engine interface preferably comprises at least two channels making it possible to ensure the redundancy of the critical functions in order to increase the reliability of the aircraft. Likewise, the said at least one engine control preferably comprises at least two redundant channels in order to increase the reliability of the aircraft.

According to a particular embodiment, the said aircraft comprises at least two engines, at least one engine interface and at least one engine control being associated respectively with each of the said at least two engines; the said aircraft further comprises means for segregation of the data exchanged in each of the systems made up of at least one engine interface and at least one engine control associated with each of the said at least two engines.

Still according to a particular embodiment, the device further comprises means for direct connection between at least one control element of the said aircraft and at least one engine control to heighten the reliability of the aircraft.

Figure 2:
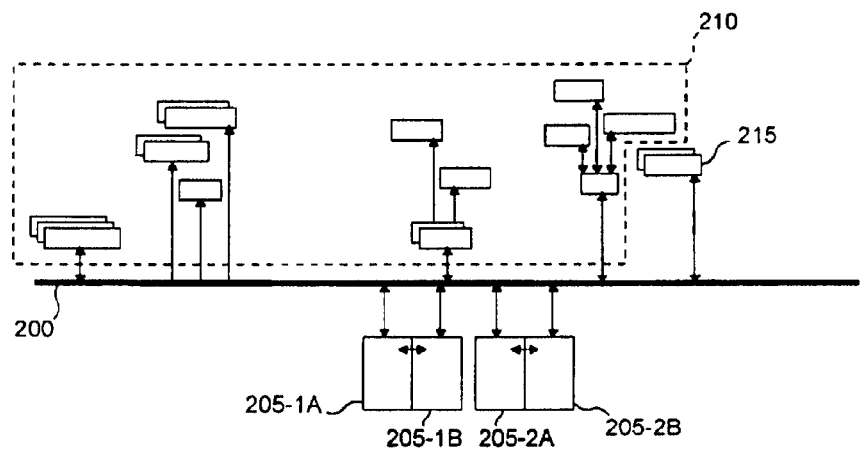
Figure 3:
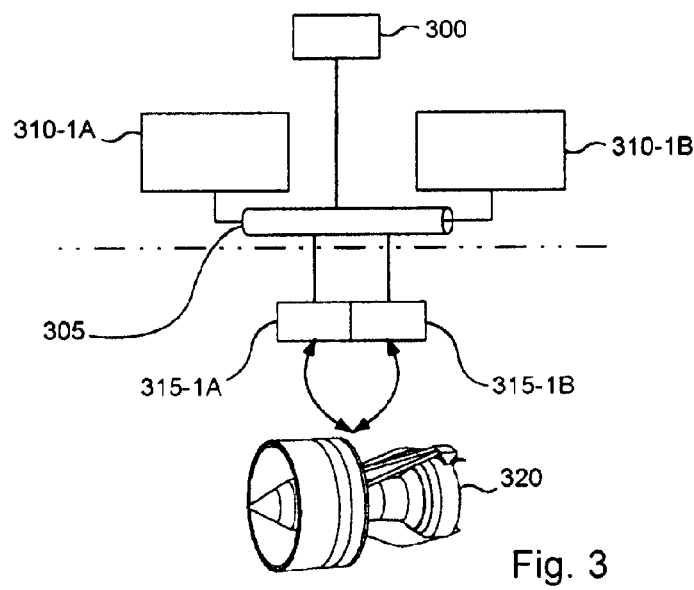
Figure 4:
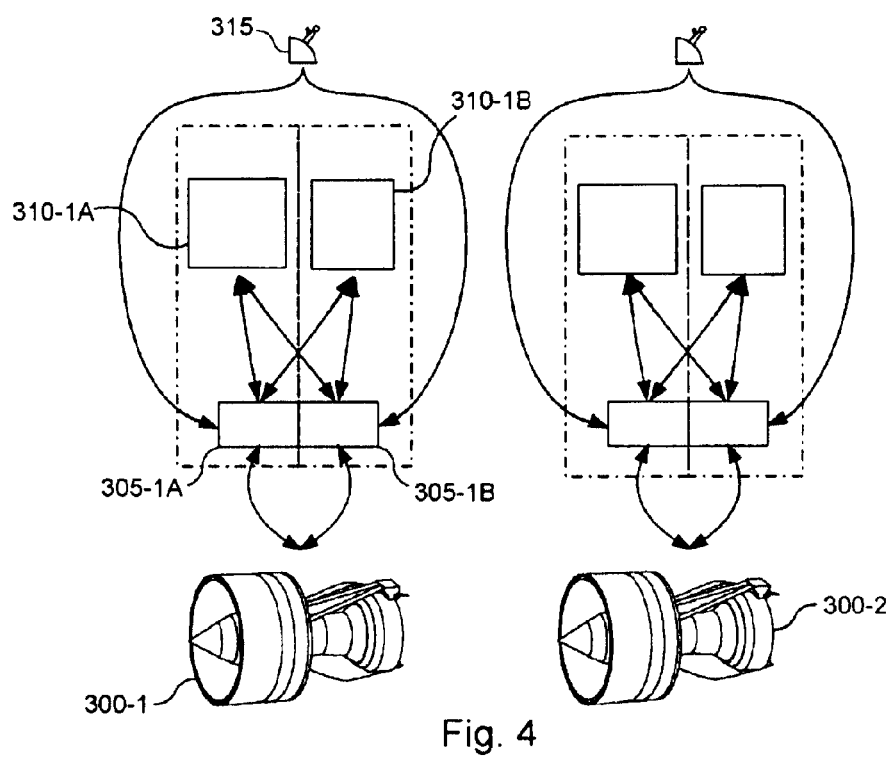

Other advantages, purposes and characteristics of this invention become apparent from the detailed description that follows, provided by way of non-limitative example, with reference to the attached drawings in which:

FIG. 1 schematically shows an example of a standard interface between the system for control of propulsion and the other avionic systems of an aircraft;

FIG. 2 schematically shows an example of an interface according to the invention between the system for control of propulsion of an aircraft comprising two engines and the other avionic systems of the aircraft;

FIG. 3 illustrates a first example of a physical architecture adapted for implementing the invention; and, FIG. 4 presents a second example of an architecture adapted for implementing the invention in which a direct link is established between the throttle controls and the engine control units.

The process according to the invention makes it possible to distribute the functions traditionally implemented in the FADECs between the avionic components and the FADECs in order to simplify the FADECs and their software. This process makes it possible to centralize the exchanges of avionic data between the FADECs and the avionic components.

In particular, the invention has as an object to shift the functions of electrical supply, of transmission of avionic data to the FADECs and of transmission of the data linked to the engines to the avionic components as well as the functions linked to the thrust reversal from the FADECs to the avionic components.

In principle, a FADEC is composed of the following two elements, an engine control unit, also called ECU (acronym for Engine Control Unit in English terminology), or an electronic engine control, also called EEC (Electronic Engine Control in English terminology). In the remainder of the description, this element generically is called an engine control; and, a combined input/output device comprising in particular connectors, an electrical supply, an interface with the actuators and an interface with the sensors.

The functions of each FADEC are mainly the following:
ignition, starting and stopping of the engine;
thrust control;
control of the outputs of the FADEC;
control of the thrust reversers;
detection of thrust malfunctions;
control of preheating;
nacelle de-icing control;
control of depressurization of the hydraulic pumps;
detection, isolation, management and indication of errors;
balancing of the vibrations;
control of the inputs of the FADEC;
identification of the software of the FADEC; and,
reprogramming of the FADEC.

According to the invention, the functions of the FADECs of the prior art are divided into two sub-systems, these two sub-systems being the following, the engine interface unit, also called EIU (Engine Interface Unit in English terminology), located in the aircraft, which has as its function to acquire data from different sources. The engine interface unit is generic for the different types of engines that can be mounted on the aircraft. The engine interface unit comprises the functions of engine integration, called EIF (Engine Integration Function in English terminology), such as redundancy and verification of consistency of the data.

the engine control, located in the engine, which has as its function to control and monitor the engine. The engine control is specific to each engine.

All the necessary data originating from the avionic components converge toward the engine interface unit before being transmitted to the engine controls. Likewise, certain data originating from the FADECs converge toward the engine interface unit before being transmitted to the avionic components.

The functions of the engine interface unit and of the engine control can be implemented in one or more computers.

According to a particular embodiment, a specific development can be provided in order to implement these functions in computers of LRU type (Line Replaceable Unit in English terminology).

Alternatively, according to another embodiment, these functions can be implemented in modular avionic computers, for example of IMA type (acronym for Integrated Modular Avionics in English terminology), in one or more modules of the CPIOM type (Core Processing Input/Output Module in English terminology).

According to another alternative, a part of these functions is implemented in computers of LRU type while another part is implemented in modular avionic computers of IMA type.

The following table presents a synthesis of different possible implementations,

|  | Engine interface functions | Specific engine functions |
| --- | --- | --- |
| Prior art (a sole LRU) | LRU in the engine | LRU in the engine |
| LRU (two different LRU) | LRU in the aircraft | LRU in the engine |
| LRU (two different LRU) | LRU in the aircraft | LRU in the aircraft |
| LRU and IMA | IMA in the aircraft | LRU in the engine |
| LRU and IMA | IMA in the aircraft | LRU in the aircraft |
| IMA (alone) | IMA in the aircraft | IMA in the aircraft |

FIG. 2 illustrates an example of physical connection according to the invention between the FADECs of an aircraft comprising two engines and the avionic components. As in the example given in FIG. 1, connection 200 is produced by a communication network. Likewise, two FADECs 205-1 and 205-2 each comprising two channels A and B are used, one FADEC being associated with each engine. The set of avionic components exchanging data with the FADECs has the reference 210. The reference 215 designates the engine interface unit through which the data exchanged between the FADECs and the avionic components pass in transit. It should be noted here that not all the data pass in transit only through the engine interface unit. In fact, the are specific direct communication needs between certain avionic components and the FADECs, in particular for reasons of security, for example in the event of failure of the engine interface unit or of the communication network used such as the AFDX network (Avionics Full Duplex Switched Ethernet in English terminology).

The comparison of FIGS. 1 and 2 illustrates the advantages obtained by the invention in the connectivity of the FADECs and of the avionic components, in particular the simplification of the necessary wiring between the avionic components and the FADECs.

The FADECs used for the implementation of the invention require reduced development and maintenance times and, consequently, their implementation reduces the development and maintenance costs. In fact, the aircraft manufacturer is able to develop, test and configure the engine interface on its own, which makes it possible to limit the exchanges between the aircraft manufacturers and the engine manufacturers, thus reducing development and maintenance delays and costs. Moreover, only one type of engine interface unit is necessary for an aircraft, irrespective of the type of engine mounted on this aircraft. The development and maintenance of the engine interface unit are independent of the development and maintenance of the engine control.

According to a particular embodiment, the engine interface unit is used as the main interface between the FADECs and the avionic system. On the one hand, the engine interface unit acquires, selects and consolidates the numerous data originating from the avionic system and transmits the essential data, in synthetic form, after having validated them. On the other hand, the engine interface unit consolidates the data originating from the engine control or controls and transmits them to the avionic components without the FADECs being directly interfaced with these avionic components. Moreover, the engine interface unit monitors the avionic components independently of the FADECs.

According to a particular embodiment, the functions of the engine interface unit are implemented in modular avionic computers of IMA type, in the existing CPIOM modules (two CPIOM modules per engine are used here). Each engine control is managed by a pair of CPIOM modules, each of the two modules running the same application software, that is to say, each of the two modules implementing the functions of the engine interface unit, and transmitting the same periodic messages containing validated data originating from the avionic system. This solution thus is based on the concept of mirror applications.

This embodiment offers, in particular, the following advantages, isolation of the engines: the two pairs of CPIOM modules do not exchange data. In this way, the requirement of isolation of the engines is observed by virtue of the segregation capacity of the networks of AFDX type;

management of breakdown of one of the CPIOM modules; in the event of breakdown of one of the CPIOM modules, the two redundant channels of a FADEC receive the data from the remaining CPIOM module;

management of breakdown of the engine control: since the architecture of the engine control is similar to that used in the prior art, that is to say a dual-channel architecture, the management of breakdown of the engine control is not affected by the invention;

management of breakdown of the IMA: the loss of the AFDX network is regarded as a sole breakdown, similar to the total breakdown of a pair of CPIOM modules. Consequently, all the security functions advantageously are based on an alternative solution using a specific wiring between the engine control and the aircraft. The engine control comprises, for example, a direct access to the throttle control;

control of the integrity of security data: if a security analysis so requires, a dual control of the security data may be provided by the engine control. The engine control is a DAL-A equipment item (Development Assurance Level in English terminology, it corresponds to the highest demand level) based on a dual-channel architecture, as simple as possible, in accordance with the requisite security demands. Moreover, data corruption through the network is detected and if need be corrected by the use of an application using a corrective code of sum-control type (checksum in English terminology) in order to increase the security of the data transmitted between the engine interface unit and the engine control; and, software programming of the engine configuration in order to differentiate the characteristics of the engines: most of the functions of the engine interface unit are identical irrespective of the engines mounted on the aircraft. Nevertheless, the engine control can indicate to the engine interface unit the type of engine used, in order to allow the activation of specific operations within the engine interface unit.

FIG. 3 illustrates a first example of a physical architecture adapted for implementing the invention. As illustrated, avionic system 300 is connected to AFDX network 305 to which there also are connected engine interface unit 310-1 comprising channels A and B as well as engine control 315-1 comprising channels A and B. Engine control 315-1 is associated with engine 320.

As indicated above, the data exchanged between engine control 315-1 and avionic system 300 are transmitted through engine interface unit 310-1.

FIG. 4 presents an example of a logical architecture adapted for implementing the invention in which a direct link is established between the throttle controls and the engine controls in an aircraft comprising two engines. As illustrated, the control and management of the engines are totally independent for each of the two engines 300-1 and 300-2. There is a physical segregation between the systems associated with each of the engines. Although the same connection of AFDX type is used and connects the systems associated with each of the engines, it has been shown that this type of connection guarantees a segregation of the data.

Engine control 305-1 comprising channels A and B is associated with engine 300-1. Each of the channels A and B of engine control 305-1 is connected to each channel of engine interface unit 310-1. In this way, channel A of engine control 305-1 is connected to channel A of engine interface unit 310-1 and to channel B of engine interface unit 310-1. Likewise, channel B of engine control 305-1 is connected to channel A of engine interface unit 310-1 and to channel B of engine interface unit 310-1. Channels A and B of the engine interface units also are connected to the avionic system (not shown).

Moreover, a direct connection is established between throttle control 315 and each of the channels A and B of engine control 305-1. This direct connection allows a control of the throttles in the event of failure of the two channels of engine interface unit 310-1 and/or of the connections established between the channels of engine interface unit 310-1 and the channels of engine control 305-1.

As illustrated, the architecture described with reference to engine 300-1 is similar to that associated with engine 300-2.

Although the electrical supply systems are not shown, a physical segregation of the electrical supplies for each of the engines preferably is observed.

According to a particular embodiment, the engine interface unit is in charge of transmitting the following data, originating from the avionic system, to the engine controls, the data linked to the outside air, in particular static pressure, total pressure and temperature, originating from three different sources of the avionic system, selected, consolidated and validated;

the position of the throttle control, consolidated and taking into account the throttle control system;

the position of the control switches of the cockpit linked to the engines, validated if need be;

the starting data (from the validated position of the cockpit switches, the starting instructions are transmitted to the engines, for example automatic or manual starting with damp or dry ventilation);

the flight statuses, in particular the flight statuses determined by the landing-gear systems;

the indication of approach idle (approach idle in English terminology);

the information item for nosing up or for takeoff; and, the status of air sampling.

Naturally other data, such as the modes for management of electrical sources, can be transmitted.

Still according to a particular embodiment, the following data are transmitted from the engine controls to the engine interface unit which is in charge of transmitting them to the avionic components having need thereof, an information item on the state of the engine indicating whether or not the engine is stopped;

an indication of engine starting;

a control for inhibition of de-icing during the takeoff phase;

an indication of a fuel leak (detected between the fuel-flow measurement device and the combustion chamber by comparison of the fuel flows for each engine with the fuel used);

a control for depressurization of the hydraulic pump (restarting of the engine in flight); and indications for monitoring of the avionic components using data originating from the engines.

The data relating to the thrust reversers, in particular the position of the thrust reversers, advantageously also are transmitted from the engine controls to the engine interface unit which is in charge of transmitting them to the avionic components having need thereof.

Naturally, in order to meet specific needs, an individual competent in the field of the invention will be able to apply modifications in the foregoing description.

The invention claimed is:

1. A device for an engine-operated aircraft, the device comprising:
   at least one avionic component positioned in the aircraft;
   at least one engine control positioned in or close to an engine of the aircraft; and
   at least one engine interface positioned in the aircraft, the at least one engine interface being adapted for exchanging data between the at least one avionic component and the at least one engine control, the at least one engine interface comprising a function to acquire data from different sources and functions of engine integration such as redundancy and verification of consistency of the data, the at least one engine interface being generic and adapted for communicating with engine controls of different types that can be mounted on the aircraft, and the at least one engine control being specific to one type of engine.

2. The device according to claim 1, wherein the at least one engine interface comprises means for selecting the data exchanged between the at least one avionic component and the at least one engine control.

3. The device according to claim 1, wherein the at least one engine interface comprises means for validating at least some of the data exchanged between the at least one avionic component and the at least one engine control.

4. The device according to claim 1, wherein the at least one engine interface is at least partially implemented in a computer of LRU type.

5. The device according to claim 1, wherein the at least one engine interface is at least partially implemented in a modular avionic computer of IMA type.

6. The device according to claim 1, wherein the at least one engine interface comprises at least two redundant channels.

7. The device according to claim 1, wherein the at least one engine control comprises at least two redundant channels.

8. The device according to claim 1, wherein the aircraft comprises at least two engines, at least one engine interface and at least one engine control being associated respectively with each of the at least two engines, and the device further comprises means for segregation of the data exchanged in each system comprising at least one engine interface and at least one engine control associated with each of the at least two engines.

9. The device according to claim 1, further comprising:
   means for direct connection between at least one control element of the aircraft and at least one engine control.

10. The device according to claim 1, wherein the at least one engine interface comprises a selecting unit configured to select the data exchanged between the at least one avionic component and the at least one engine control.

11. The device according to claim 1, wherein the at least one engine interface comprises a validating unit configured to validate at least some of the data exchanged between the at least one avionic component and the at least one engine control.

12. The device according to claim 1, wherein the aircraft comprises at least two engines, at least one engine interface and at least one engine control being associated respectively with each of the at least two engines, and the device further comprises a segregation unit configured to segregate the data exchanged in each system comprising at least one engine interface and at least one engine control associated with each of the at least two engines.

13. The device according to claim 1, further comprising:
   a direct connection between at least one control element of the aircraft and at least one engine control.

* * * * *